(12) United States Patent
Diament et al.

(10) Patent No.: US 9,003,430 B2
(45) Date of Patent: Apr. 7, 2015

(54) DYNAMIC TRANSFER OF SELECTED BUSINESS PROCESS INSTANCE STATE

(75) Inventors: Judah M. Diament, Bergenfield, NJ (US); Aliza R. Heching, Bronx, NY (US); Matthias Kloppmann, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 13/010,169

(22) Filed: Jan. 20, 2011

(65) Prior Publication Data

US 2012/0192189 A1 Jul. 26, 2012

(51) Int. Cl.
G06F 3/00 (2006.01)
G06F 9/46 (2006.01)
G06F 13/00 (2006.01)
G06Q 10/06 (2012.01)

(52) U.S. Cl.
CPC .................................. G06Q 10/067 (2013.01)

(58) Field of Classification Search
None
See application file for complete search history.

(56) References Cited

U.S. PATENT DOCUMENTS

| | | | |
|---|---|---|---|
| 7,349,890 B1 * | 3/2008 | Pathak et al. | 706/47 |
| 7,383,267 B2 | 6/2008 | Deimel et al. | |
| 7,610,211 B2 | 10/2009 | Casati et al. | |
| 2004/0187089 A1 * | 9/2004 | Schulz | 717/101 |
| 2005/0165822 A1 | 7/2005 | Yeung et al. | |
| 2006/0112062 A1 | 5/2006 | Leymann et al. | |
| 2008/0196027 A1 | 8/2008 | Hohmann et al. | |
| 2008/0215389 A1 | 9/2008 | Heidasch | |
| 2009/0125366 A1 | 5/2009 | Chakraborty et al. | |
| 2009/0198532 A1 | 8/2009 | Litoiu et al. | |
| 2010/0121668 A1 | 5/2010 | Hohmann | |
| 2010/0122251 A1 | 5/2010 | Hohmann | |

OTHER PUBLICATIONS

Weber, Barbara et al., "Change Patterns and Change Support Features—Enhancing Flexibility in Process-Aware Information Systems," Data & Knowledge Engineering 66 (2008); pp. 438-466.
Yoo, Sanghuyn et al., "Rule-based Dynamic Business Process Modification and Adaptation," International Conference on Information Networking 2008, Mar. 21, 2008.
Giaglis, George M. et al., "BPR in Support of Electronic Commerce: A Case Study," Ninth International Workshop on Database and Expert Systems Applications, 1998, Aug. 6, 2002.
White, Stephen A. (BPM Architect), "Introduction to BPMN," IBM, Oct. 16, 2006.
Bell, Donald (IT Architect), "UML basics: The sequence diagram," IBM Corporation, Feb. 16, 2004.

* cited by examiner

*Primary Examiner* — Craig Dorais
(74) *Attorney, Agent, or Firm* — Preston Young, Esq.; Matthew M. Hulihan, Esq.; Heslin Rothenberg Farley & Mesiti P.C.

(57) ABSTRACT

Business processes that may be affected by events, conditions or circumstances that were unforeseen or undefined at modeling time (referred to as unforeseen events) are modeled and/or executed. Responsive to an indication of such an event during process execution, a transfer is performed from the process, in which selected data is stored and the process is terminated. The selected data may then be used by a target process. The target process may be, for instance, a new version of the same process, the same process or a different process. The target process may or may not have existed at the time the process was deployed.

18 Claims, 10 Drawing Sheets

DYNAMIC TRANSFER OF SELECTED BUSINESS PROCESS INSTANCE STATE

BACKGROUND

This invention relates, in general, to business processes, and in particular, to the modeling and execution of business processes to accommodate unforeseen events.

Business process modeling enables the visualization, documentation, modeling and analysis of business processes for understanding and process execution. Business process runtimes, such as WebSphere® Process Server (WPS), deploy and execute business processes.

Robust process models can be created that account for a range of exceptional circumstances. The real world, however, is always more complex than anything that can realistically be captured in a process model. Unforeseen events, conditions and circumstances that can significantly affect a business do occur. For example, unprecedented changes in financial markets, natural disasters, political upheaval, terror attacks, etc. Calling out to rules systems can provide a level of indirection in the process, but still cannot deal with the unforeseen, which is not captured in the rules.

Today, there are branching constructs to allow models to account for a range of circumstances. However, there is no description of how to prepare for the environment entering a state for which the process model does not account.

BRIEF SUMMARY

The shortcomings of the prior art are overcome and additional advantages are provided through the provision of a method of managing processes of a processing environment. The method includes, for instance, obtaining, by a processor of the processing environment, an indication that a transfer event defined for a process executing within the processing environment is to be performed, the indication being responsive to an occurrence of a particular event; and performing, by the processor responsive to the obtaining, the transfer event to transfer out of the process, the transfer including storing selected data of the process and terminating the process, the selected data including a portion of the data of the process that is relevant for the transfer, wherein another portion of the data of the process is unselected.

Systems and computer program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
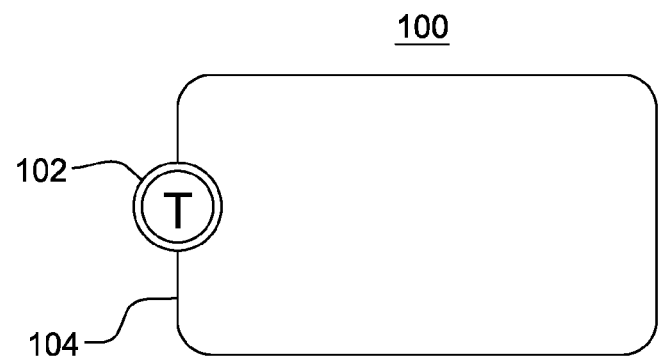
FIG. 1A depicts one example of a transfer event used in accordance with an aspect of the present invention.

In accordance with an aspect of the present invention, a capability is provided for modeling and/or executing business processes that may be affected by events, conditions or circumstances that were unforeseen or undefined at modeling time (referred to herein as unforeseen events). That is, while the risk of an event occurring at a given point in the process is recognized, the particular event is unforeseen or undefined. Further, the path to take responsive to such an event is also undefined. To accommodate such unforeseen events, in accordance with an aspect of the present invention, one or more transfer events are defined at one or more points in the process at which unforeseen events may occur.

Then, during process execution, responsive to reaching a transfer event and being provided an indication that a transfer is to be performed (e.g., due to the occurrence of an unforeseen event), a transfer from the process is performed. The transfer includes, for instance, storing selected data and terminating (e.g., stopping, pausing, ending) the process. In this example, an exceptional or alternate path is not defined. Instead, a decision is made, for instance, at the time of the transfer of how to proceed. As one example, the selected data may be used by another process (referred to herein as a target process). The target process may be, for instance, a new version of the same process, the same process or a different process. The process and the target process do not have to have anything in common in terms of their graph structures and/or there do not have to be interdependencies of activities.

The target process may or may not have existed at the time the transferring process was deployed.

As indicated above, in accordance with an aspect of the present invention, only selected data is stored. In one example, the selected data is the business state (or a portion thereof) and optionally, the technical state (or a portion thereof) of the process, which are described herein. The unselected data, in this example, is the execution state of the process, also described herein. Business state is, for instance, the collection of elements within a business process model that represent data whose content and value are defined and understood at the level of the business need that the process model addresses. This state is usually modeled explicitly as data elements in the process model. Examples include contracts, documents, e-mails, etc.

Technical state is, for instance, the collection of elements within a business process that do not exist at the business level, but are needed regardless of the exact runtime used to execute the model. Examples include endpoint Uniform Resource Locators (URLs) of required services, certificates to identify participants, etc. This state may not initially be modeled as part of the process, but would be added to the model by IT staff at a later stage of the modeling lifecycle.

Execution state is, for instance, the collection of runtime artifacts specific to the exact runtime used to execute the model. Examples include process navigation pointers, generated code, event listeners, process IDs, memory caches, etc.

In accordance with an aspect of the present invention, modelers of the business process specify which elements in the business state and/or technical state are valuable should the process terminate at a given point. This enables easier migration to a target process, provided that the terminating process includes and passes on the business and/or technical state required and/or desired by the target process.

Creating such a specification for every point in the process model is likely to be considered too time consuming. However, identifying points in the model where the risk associated with process failure is above average, either due to a higher likelihood of failure at that point or due to the cost associated with failure at that point, and creating the specification for those points, is advantageous.

To support the creation of the specification and to facilitate easy migration to a target process, a new model element for use in business process modeling is created, referred to as a transfer event. Transfer events identify, for instance, points at which selected data (e.g., business and/or technical state) can be stored and the process instance terminated. The modeler supplies a schema for the selected data that will be stored if a transfer occurs at that point in the process execution, and maps the schema elements to data elements in the process model. This defines which data elements are of business or technical value and are to be transferred, and which elements are merely intermediate artifacts which are only part of the process execution or are elements of business or technical value but are not to be transferred. For instance, there may be scenarios where some data is in fact business level data, but is only relevant to one specific business process and not others. For example, assume that activity X requires documented management approval, but there is only one process that performs X; X would then be of business value, as opposed to part of the process execution. However, X may not be selected, in this example, since the selected data is going to be used by another process and X is not useful for the other process.

Under typical circumstances, the process executes normally and the transfer will not occur. If, however, an unforeseen event makes the currently executing process no longer appropriate, the process runtime can be signaled to execute a transfer, in which it stores the selected data and then terminates the process. The system can later re-create the process instance from the point at which it was terminated, execute the process instance from an earlier stage of processing, pass its data to a new instance of a different process (pre-modeled or newly modeled), or do nothing and wait for human analysis and intervention to determine how to proceed.

Transfer events thus allow the modeler to define how a process instance should terminate gracefully at specific points. If unforeseen events occur at a point where a transfer event was not defined in the model, then process execution continues in a conventional manner. The process model could be updated to include a transfer event at that point in future instances.

In addition to terminating at transfer events, processes can also be started or re-started at transfer events, assuming the available state matches the schema associated with the transfer event. Again, in one example, transfer events are ignored if the system was not signaled to activate them.

In accordance with an aspect of the present invention, transfer events can appear in a business process model in one of the following ways:

Referring to FIG. 1A, a transfer event 100 with a solid border 102 on the left boundary 104 of an activity indicates that if signaled, the process will transfer before the activity starts. A process started at the point of such a transfer event starts from the beginning of the activity on whose boundary it is found.

Figure 1B:
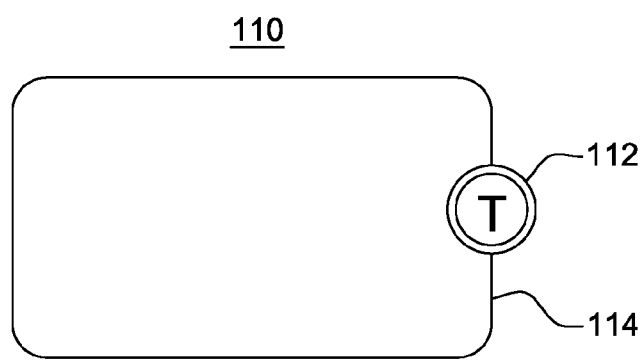
FIG. 1B depicts another example of a transfer event used in accordance with an aspect of the present invention.

Referring to FIG. 1B, a transfer event 110 with a solid border 112 on the right boundary 114 of an activity indicates that if signaled, the activity will be canceled and the process transferred. A process started at the point of such an interrupting transfer event starts from the beginning of the activity on whose boundary it is found.

Figure 1C:
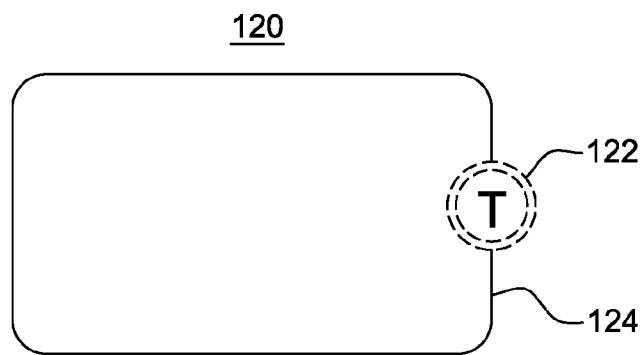
FIG. 1C depicts yet another example of a transfer event used in accordance with an aspect of the present invention.

Referring to FIG. 1C, a transfer event 120 with a dashed border 122 on the right boundary 124 of an activity indicates that if signaled, the activity will first complete and then the process will transfer. A process started at the point of such a non-interrupting transfer event starts from the beginning of the activity on whose boundary it is found.

Figure 2A:
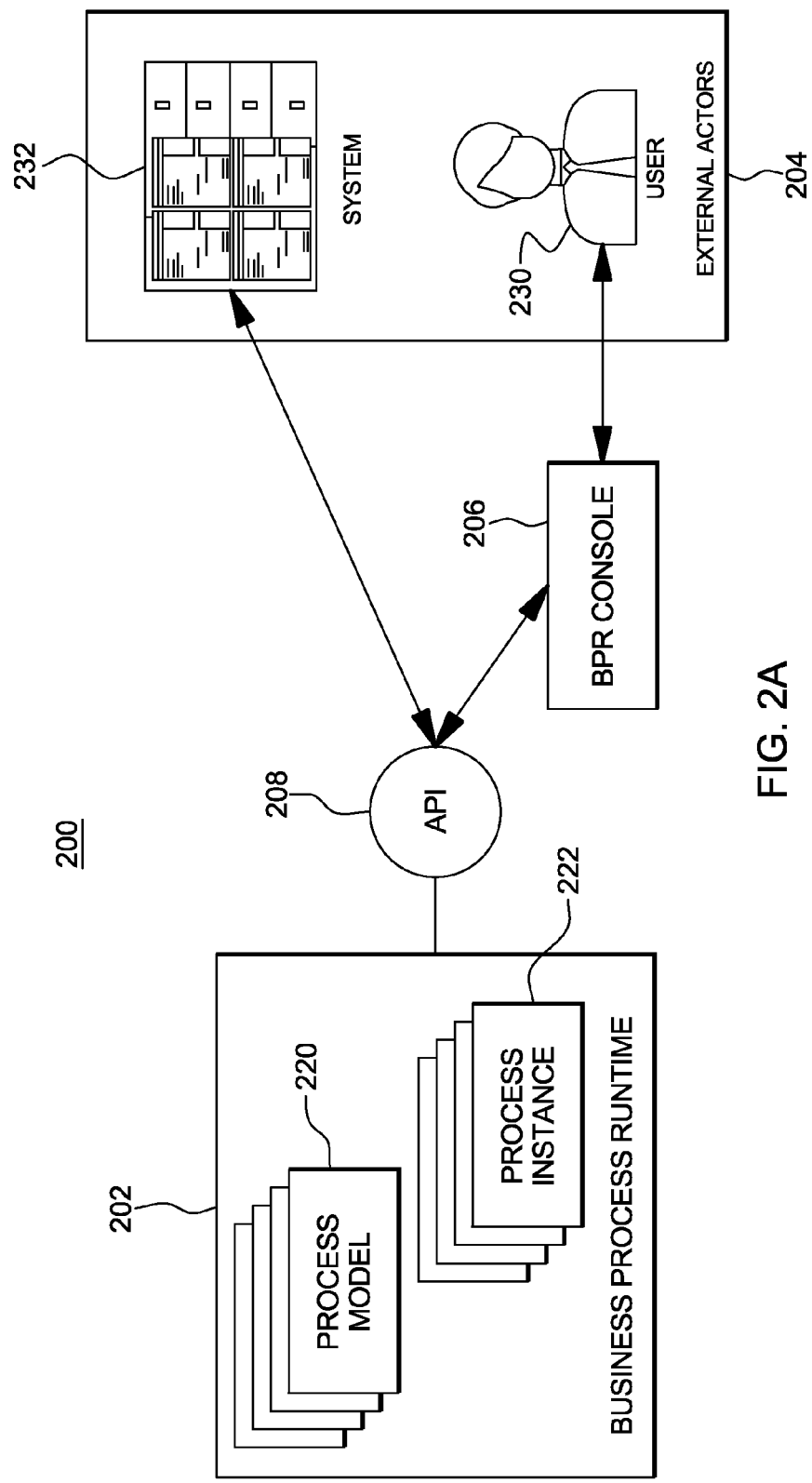
FIG. 2A depicts one example of various system components used in modeling and/or executing a process, in accordance with an aspect of the present invention.

Transfer events are used, for instance, in modeling a business process. Once modeled, the process is deployed and executed in a runtime environment. One embodiment of a system used to model and/or run a process is described with reference to FIG. 2A. As shown, system 200 includes a plurality of system components, including, for instance, a business process runtime (BPR) 202 coupled to one or more external actors 204 via a console 206 and/or an application programming interface (API) 208.

Business process runtime 202 creates, executes and manages process instances. It includes, for instance, one or more process models 220 and one or more process instances 222. A process model is, for instance, a declarative business process model which specifies the activities and flows of a business process. A process model is static and has no state. The process model includes, in accordance with an aspect of the present invention, data schemas for transfer events and links from schema elements to data elements in the process model that indicate which data elements are saved as each part of the transfer schema. A process instance 222 is a runtime instantiation of a process model. It has state and data associated with it.

One example of a business process runtime is the WebSphere® Process Server (WPS), offered by International Business Machines Corporation, Armonk, N.Y. WebSphere® is a registered trademark of International Business Machines Corporation, Armonk, N.Y. Other names used herein may be registered trademarks, trademarks or product names of International Business Machines Corporation or other companies.

Coupled to the business process runtime is API 208, which allows external actors (e.g., human users 230 or other systems 232) to add models; create, start, and stop instances; retrieve objects describing process models and instances; and search for and activate transfer events. The external actors invoke the API directly or via console 206, which is a user interface that allows users to easily interact with the API.

Figure 2B:
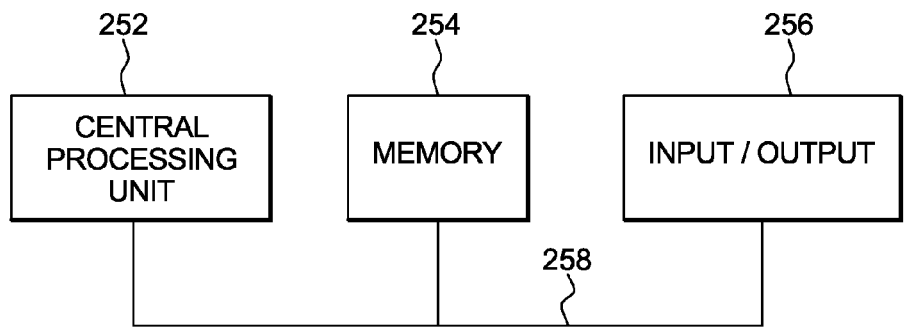
FIG. 2B depicts one example of a computing environment to execute one or more of the system components of FIG. 2A, in accordance with an aspect of the present invention.

The business process runtime, API, console and/or external system may execute on the same computer system or different computer systems. One example of a computer system to execute one or more of the system components is a computer system based on the z/Architecture® offered by International Business Machines Corporation, such as a z/Series® server. In one example, with reference to FIG. 2B, a computer system 250 includes one or more central processing units 252, at least one memory 254, and one or more input/output devices and/or interfaces 256 coupled to one another via one or more buses 258. At least one of the central processing units executes an operating system, such as z/OS®.

Although one example of a computer system is provided, one or more aspects of the present invention are not limited to such a computer system. For instance, the computer system need not be based on the z/Architecture®, but can be based on many other architectures, including, but not limited to, PowerPC®, as well as others. Further, the server can be other than a z/Series® server, such as a Pseries® server or other types of servers. Further, the operating system need not be z/OS®, but can be other types of operating systems, such as AIX®, Linux, as well as others. Many examples exist without departing from the spirit of the present invention. (z/Architecture®, zSeries®, z/OS®, PowerPC®, Pseries®, and AIX® are registered trademarks of International Business Machines Corporation, Armonk, N.Y.)

To provide a business process instance, initially, the process is modeled. Modeling techniques exist today and may be used for this modeling. For example, the BPMN (Business Process Modeling Notation) technique or other techniques may be used. One example of BPMN is described in "Introduction to BPMN," by Stephen A. White, BPM Architect, IBM, Oct. 16, 2006. BPMN is a flow-chart based notation for defining business processes. It provides a mechanism to generate an executable Business Process (BPEL) from the business level notation. There are numerous BPMN tools that may be used for modeling, including, for instance:

Enterprise Architect: BPMN plugin (Sparx Systems)
    Enterprise Architect (EA) is a UML modeling tool that offers an optional BPMN plugin.
MagicDraw (No Magic)
    MagicDraw is another UML modeling tool that supports BPMN in its Enterprise edition.
UModel: Enterprise Edition (Altova)
Business Process Modeler (eClarus Software)
Lombardi Teamworks (Lombardi Software)
ActiveVOS (Active Endpoints)
Business Process Visual Architect (Visual Paradigm)
    Business Process Visual Architect is a customized version of the Visual Paradigm UML modeling tool that emphasizes business process modeling and supports BPMN notation.
System Architect (IBM/Telelogic)
    System Architect, a.k.a. "Popkin" includes support for BPMN.
Intalio|BPMS (Intalio)
    Intalio|BPMS supports both BPMN and BPEL, and is based on layering and dual licensing. Intalio|BPMS is distributed in three editions: Intalio|BPMS Open Source Edition, is distributed under the Mozilla Public License (MPL);
    Intalio|BPMS Community Edition is available in binary form and licensed under an End User License Agreement without commercial support; and Intalio|BPMS Enterprise Edition is available in binary form and licensed under an End User License Agreement with commercial support.
BPMN Modeler (Eclipse)
    BPMN Modeler is a Business Diagram (BPD) editor for business analysts that is implemented as part of the SOA Tools Platform Project for the Eclipse open source platform.

In one example, the selected modeling technique is executed on an external actor system under control of a modeler (e.g., human), and then, the created model is forwarded to the business process runtime.

Although process modeling is not new, transfer events have been added to the modeling process, in accordance with an aspect of the present invention. In particular, in accordance with one or more aspects of the present invention, one or more transfer events are added to a process model to accommodate unforeseen events. One embodiment of the logic associated with providing such transfer events is described with reference to FIG. 3. In one example, this logic is executed by a processor of the external system (or other processor) used to create the process model.

Figure 3:
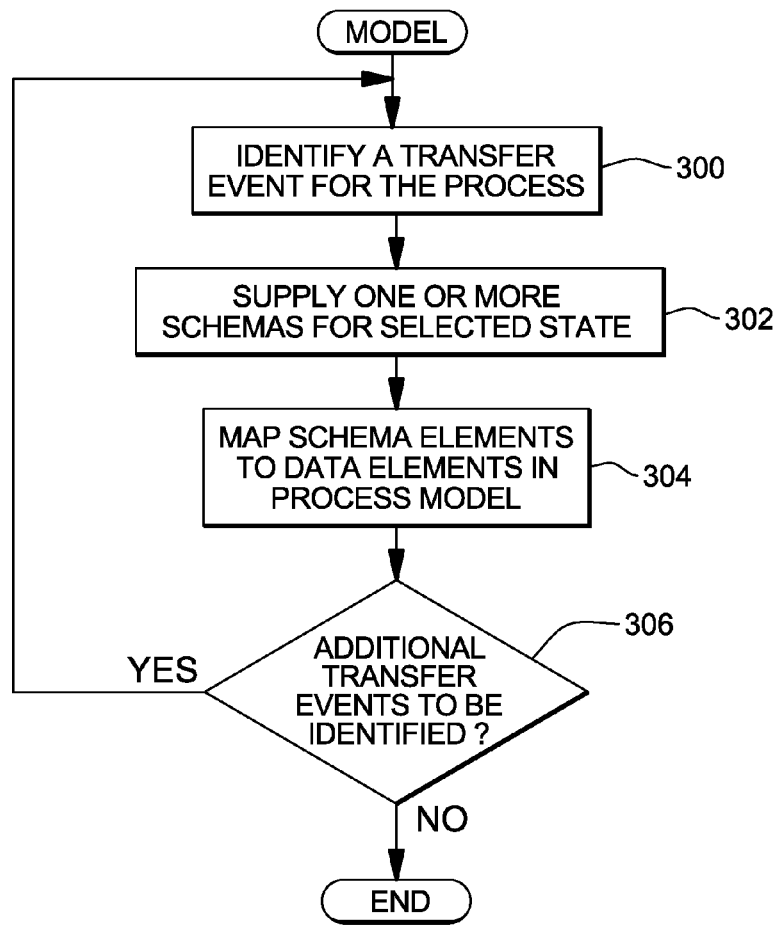
FIG. 3 depicts one embodiment of the logic used in modeling a process in which one or more transfer events are included in the model, in accordance with an aspect of the present invention.

Referring to FIG. 3, in one example, during the modeling of a process, a transfer event is identified for the process, STEP 300. The transfer event is introduced to a model at a selected point (e.g., a point that may be affected by an unforeseen event) by placing a transfer event symbol (described above) on the border of an activity. The symbol selected depends, for instance, on when the process is to transfer.

Once the event is added to the model, the modeler specifies what state, embodied by data elements, this transfer event captures. That is, in accordance with an aspect of the present invention, not all of the data is selected for the transfer. Instead, different types of state have been identified, in accordance with an aspect of the present invention, including, for instance, business, technical and execution state, and these states are treated differently. For instance, based on business value, business and/or technical state, but not execution state, are selected for transfer. Further, in one example, specific elements of the business and/or technical state are selected. The modeler connects the selected data elements of the model to the transfer event.

One or more schemas are supplied for selected state of the business process being modeled, STEP 302. For example, a schema is provided for the selected business and/or technical state. Additionally, the elements of the schema are mapped to data elements in the process model, STEP 304. One example of a schema/mapping is provided below:

The following example uses Javascript Object Notation (JSON). First, it defines a type named "Document", that includes 4 data elements: the URL to the repository, user name and password to login to the repository, and a document path within the repository to the document. TE1 then defines the schema and maps a transfer event that uses the definition of document. Elements in the transfer event include, for instance, the name of the schema element (ex. —BillOfLading), followed by the type of the element (in this example, they happen to all be Document), followed by a simple XQuery expression leading to the data element in the process model to be saved/transferred—this XQuery expression is in effect the mapping.

```
"typeDef":{
        "name": "Document",
        "elements":
            {"document repository": "URL"},
            {"user name": "String"},
            {"password": "String"},
            {"document path": "string"}
        }
    }
"TE1": {
    "BillOfLading": {"Document", "processModel/data/BillOfLading"},
    "CertOfOrigin": {"Document,"processModel/data/CertificateOfOrigin""},
    "ShipAndCrew": {"Document","processModel/data/ShipAndCrewInfo"},
    "ExportPackingList":{"Document","processModel/data/ExportPackingList"}
}
```

Thus, in the above example, TE1 is the schema for the transfer event and it uses in its schema the document type that was previously defined. Within the schema is a mapping to data elements in the process model. For instance, "processModel/data/BillOfLading" indicates that the bill of lading is to be taken as a piece of data.

Thereafter, a determination is made as to whether there are any other transfer events to be identified in the process model, INQUIRY 306. If there are, then processing continues with STEP 300. Otherwise, this part of the modeling process is complete.

Prior and subsequent to performing the above steps to identify one or more transfer events in a process model, other modeling may take place for the process. This modeling is well known in the art, and therefore, not further described herein.

Subsequent to modeling the process, at some later point in time, a process instance, corresponding to the model, is created and executed. For instance, the BPR creates and executes an instance of the process model deployed to the BPR, responsive to a request by an external actor. One embodiment of the logic associated with executing a process when there is at least one transfer event is described with reference to FIG. 4. In this example, the process is executed by the business process runtime.

Figure 4:
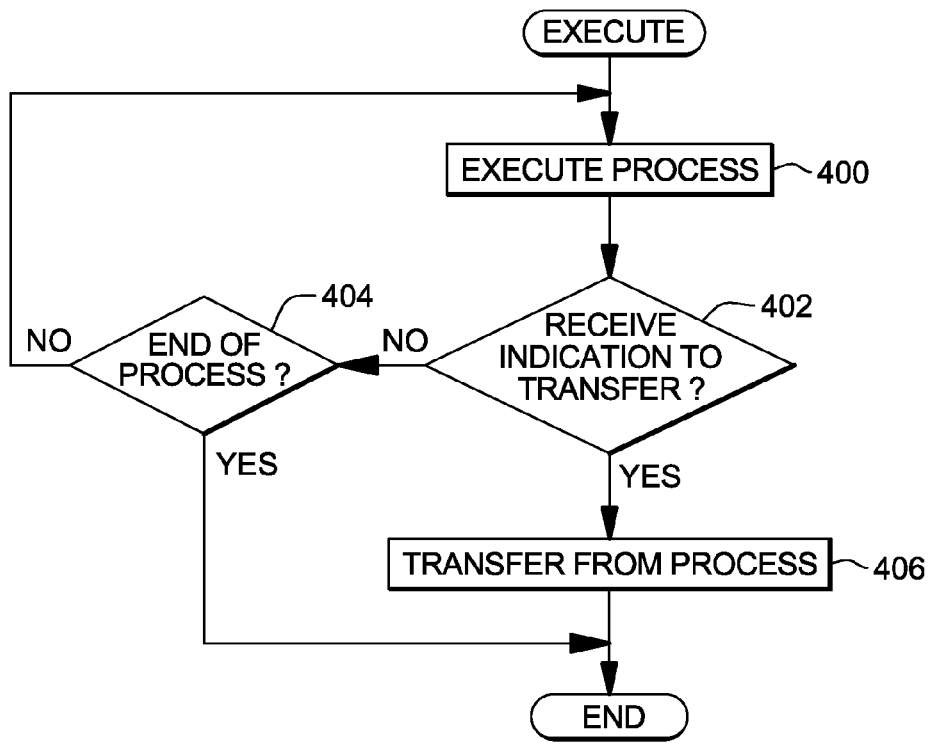
FIG. 4 depicts one embodiment of the logic used to execute a process that includes a transfer event, in accordance with an aspect of the present invention.

Referring to FIG. 4, in one example, the process (i.e., process instance) begins to execute, STEP 400. If an indication is not received to transfer, INQUIRY 402, then the process continues executing, assuming the end of the process has not been reached, INQUIRY 404. This is true even if transfer events are defined for the process and the process has reached a point where a transfer event is defined. In this embodiment, a transfer is performed at a particular point in the process, if there is a defined transfer event and an indication that the transfer is to occur. If there is a defined transfer event, but no indication to transfer, execution of the process continues as if no transfer event is defined.

If during execution, an indication to transfer is received either by command or some other manner and there is a corresponding transfer event, INQUIRY 402, then a transfer from the process is performed by, for instance, the business process runtime, STEP 406. This is described in further detail with reference to FIG. 5.

Figure 5:
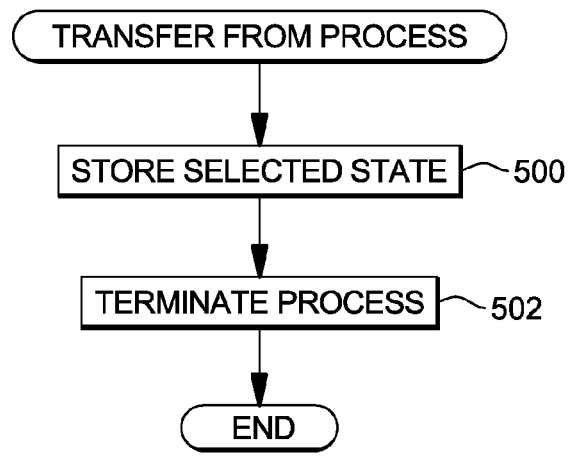
FIG. 5 depicts one embodiment of the logic used to transfer from a process, in accordance with an aspect of the present invention.

Referring to FIG. 5, in one embodiment, the transfer includes storing the selected state, STEP 500, and then terminating the process, STEP 502. In this example, only the selected state (e.g., the business state (or a portion thereof) and/or the technical state (or a portion thereof) is stored. The other state, such as the execution state, is not stored for transfer. The state is stored according to the schema provided for the state.

The stored state can then, in one example, be used by a target process, which may be a new version of the old process, the same old process, or a totally different process. The target process is to include, in this example, a transfer event that corresponds to the transfer event of the terminating process (e.g., has the same schema (or a subset thereof) as the schema of the transfer event of the terminating process). If the stored state is to be used by a target process, then validation is performed before its use. This is described in further detail with reference to FIG. 6. In one example, this logic is performed by the business process runtime (either the same one or a different one that executes the transferring process).

Figure 6:
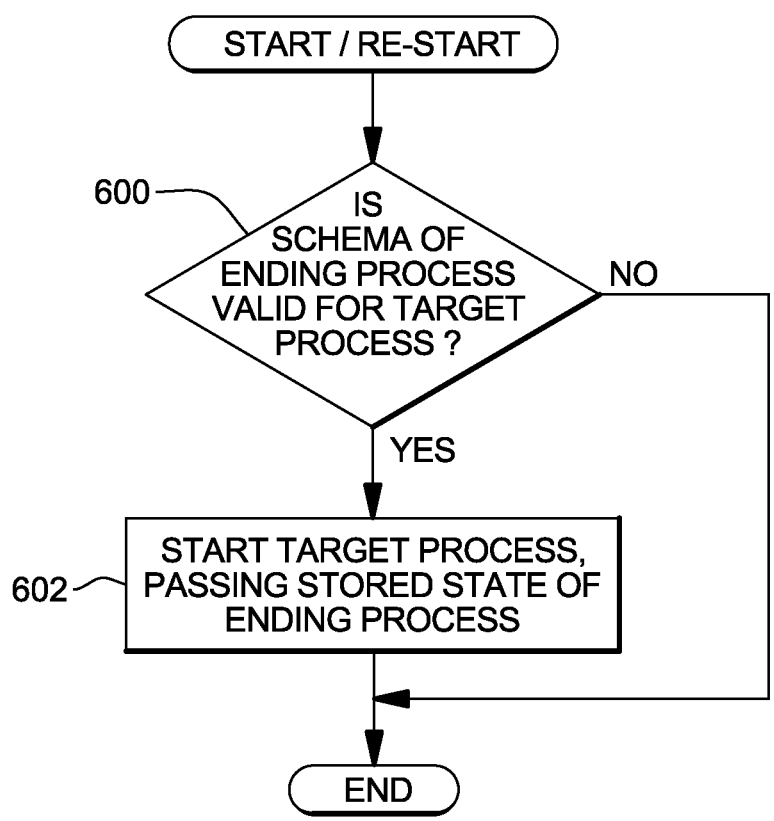
FIG. 6 depicts one embodiment of the logic used to start/re-start a process using the state of another process, in accordance with an aspect of the present invention.

Referring to FIG. 6, if the state is to be used by a target process, a determination is made as to whether the schema(s) of the terminated process is (are) valid for the target process, INQUIRY 600. For instance, each schema of the terminated process is compared to one or more schemas of the target process, and if a match is found (or one is a valid subset of the other, as defined by the modeler), then the schema(s) of the terminated process is (are) valid. If they are not valid, then the state is not used for the target process and an error indication may optionally be provided. Otherwise, the target process is started and the stored state of the terminated process is passed to the target process, STEP 602. The target process then executes like any other process.

Figure 7:
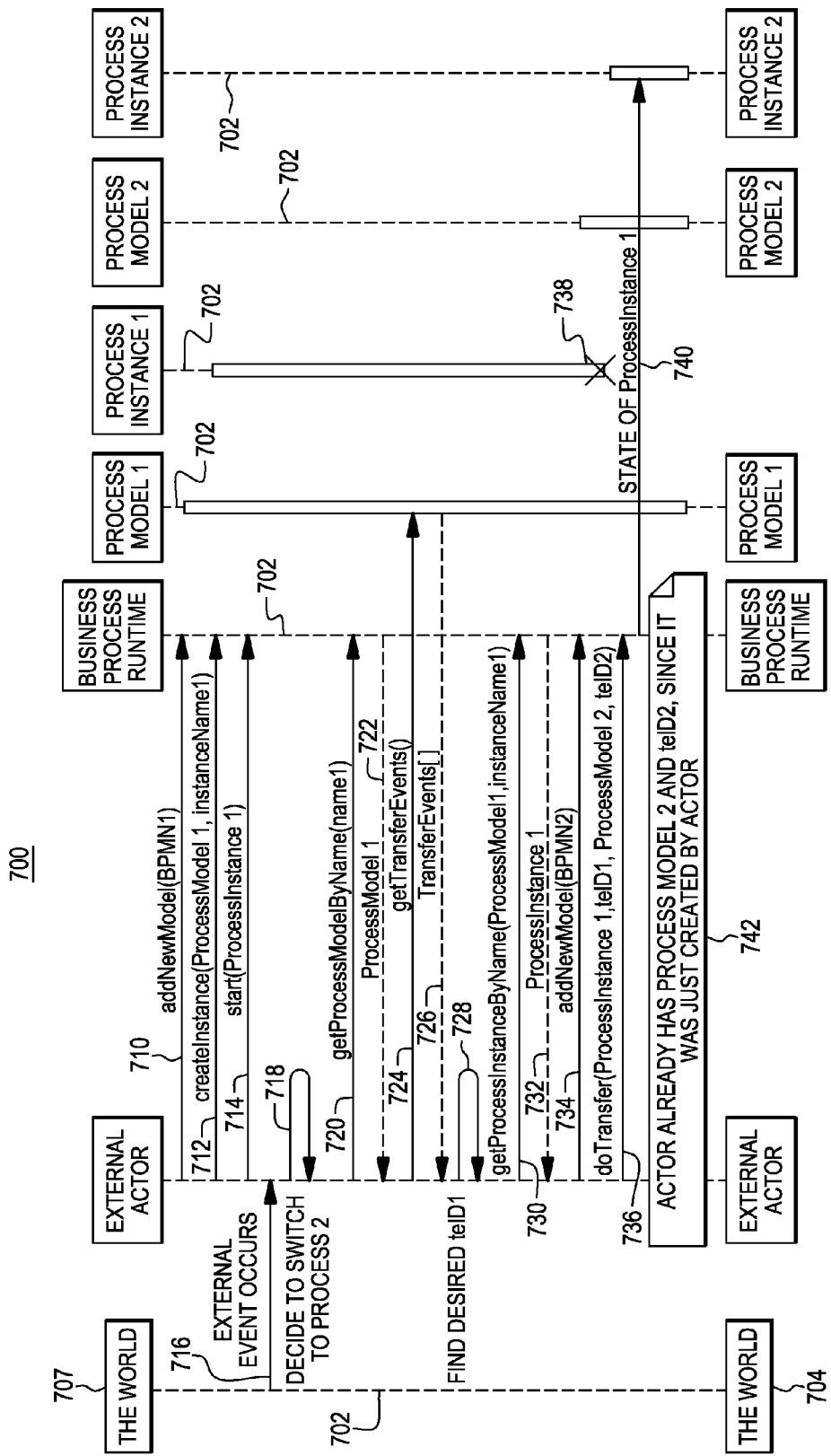
FIG. 7 depicts one example of a sequence diagram depicting a transfer to a newly created process, in accordance with an aspect of the present invention.

Further details regarding transferring to a target process are described with reference to FIG. 7. FIG. 7 depicts one example of a flow, which is expressed as a Unified Modeling Language (UML) sequence diagram 700. One example of UML is described in "UML basics: The sequence diagram," Donald Bell, IT Architect, IBM Corporation, Feb. 16, 2004.

This example flow assumes that if the external actor is another system, it is using API 208 (FIG. 2A), and if the external actor is a human, the external actor is using BPR console 206. The flow assumes that both the source process (i.e., the transferring or terminating process) and the target process (i.e., the process to receive the selected data) include at least one transfer event. The flows described herein are just examples and are not exclusive of other flows. Different flows may result, for example, from a user of the BPR console looking at one process model (getProcessModelByName, getTransferEvents), deciding that it is not the right target and then looking at another process model (getProcessModelByName, getTransferEvents) and then going ahead with the transfer. Other flows may also result form other actions.

In order for the state of a source to be transferred to a target, their respective transfer events are to have the same schema or a valid subset. In one example, schema elements can be marked as "required" or "optional", such that a transfer can take place as long as the source provides all schema elements that are required by the target.

"getTransferEvents" can be further refined such that it takes a source transfer element as a parameter, and only returns target transfer elements whose schema matches the source transfer element's schema. Additionally, "doTransfer" will check if teID1 in processInstance1 is after the process navigation pointer, i.e., it is defined on an activity that has not yet been executed. If it is before the process navigation pointer, the transfer does not occur, in this example. In a process execution engine (e.g., business process runtime), the process navigation pointer references the current point of execution in the process model.

Referring to FIG. 7, sequence diagram 700 includes a plurality of lifelines 702, the name of each being included in the rectangle boxes 704, which may be at the top, bottom or both of each lifeline. The vertical dimension of the diagram (e.g., the lifelines) shows, top down, the time sequence of messages/calls, as they occur; and the horizontal dimension of the diagram shows, left to right, the object instances to which the messages are sent. To show an object (i.e., lifeline) sending a message to another object, a line to the receiving object is drawn with, for instance, a solid arrowhead (if a synchronous call operation) or with, for instance, a stick arrowhead (if an asynchronous signal). The message/method name is placed above the arrowed line. The message that is being sent to the receiving object represents an operation/method that the receiving object's class represents.

As shown in FIG. 7, there are a number of object instances including The World, External Actor, Business Process Runtime, Process Model 1, Process Instance 1, Process Model 2 and Process Instance 2. In this particular example, the External Actor instance sends a message 710 (addNewModel (BPMN1)) to the Business Process Runtime, then another message 712 (createInstance (ProcessModel 1, instanceName1)), as well as a third message 714 (start (ProcessInstance 1)). Further, The World instance sends a message 716 (external event occurs) to the External Actor, and the External Actor sends a message 718 to itself (decide to switch to process 2; this is a self-referential message).

Subsequently, External Actor sends another message 720 (getProcessModelByName(name1)) to Business Process Runtime and Business Process Runtime sends back a response 722 (ProcessModel 1)). Response messages are optional in sequence diagrams, but may be added, as herein, to provide further detail. Thereafter, External Actor sends a message 724 (getTransferEvents( ) to Process Model 1; and Process Model 1 returns a response 726 (TransferEvents[ ]).

Subsequently, External Actor sends itself a message 728 to find the desired transfer event ID1, and then forwards a message 730 (getProcessInstanceByName (ProcessModel1, instanceName1)) to Business Process Runtime. The Business Process Runtime returns a response 732 (ProcessInstancel)). Thereafter, External Actor sends a message 734 (addNewModel(BPMN2)) and a message 736 (doTransfer (ProcessInstance 1, teID1, ProcessModel2, teID2)) to Business Process Runtime. Process Instance 1 terminates 738, responsive to an indication of the transfer event, and the Business Process Runtime sends the state of Process Instance 1 (740) to Process Instance 2, which begins to execute (or already is executing). The External Actor already has ProcessModel2 and teID2, since it was just created by the actor (see 742 on sequence diagram. This concludes this example of a sequence diagram in which a transfer is performed to a newly created process.

Figure 8:
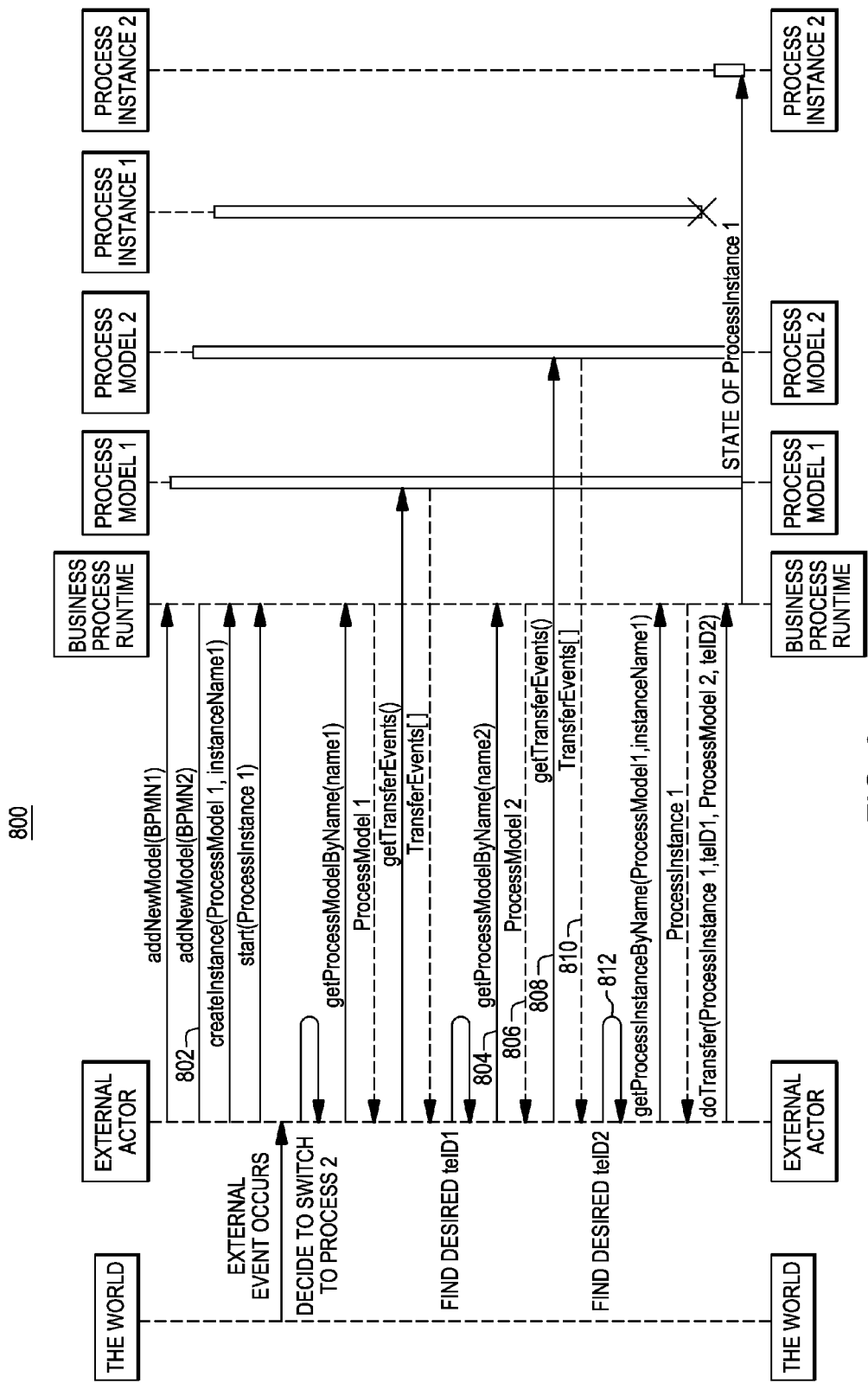
FIG. 8 depicts one example of a sequence diagram depicting a transfer to a pre-modeled process, in accordance with an aspect of the present invention.

Another example of a sequence diagram is depicted in FIG. 8. In this example sequence diagram 800, a transfer is performed to a pre-modeled process. Diagram 800 is similar to diagram 700 except, for instance, the message addNewModel (BPMN2) 802 is performed earlier in the process (message 802 versus message 734 in FIG. 7), and messages are added to locate the pre-modeled process (e.g., messages 804-812; FIG. 8).

The above sequence diagrams are just offered as examples. There are many other sequence diagrams, including different types of diagrams, that may be used without departing from the spirit of the present invention.

Figure 9A:
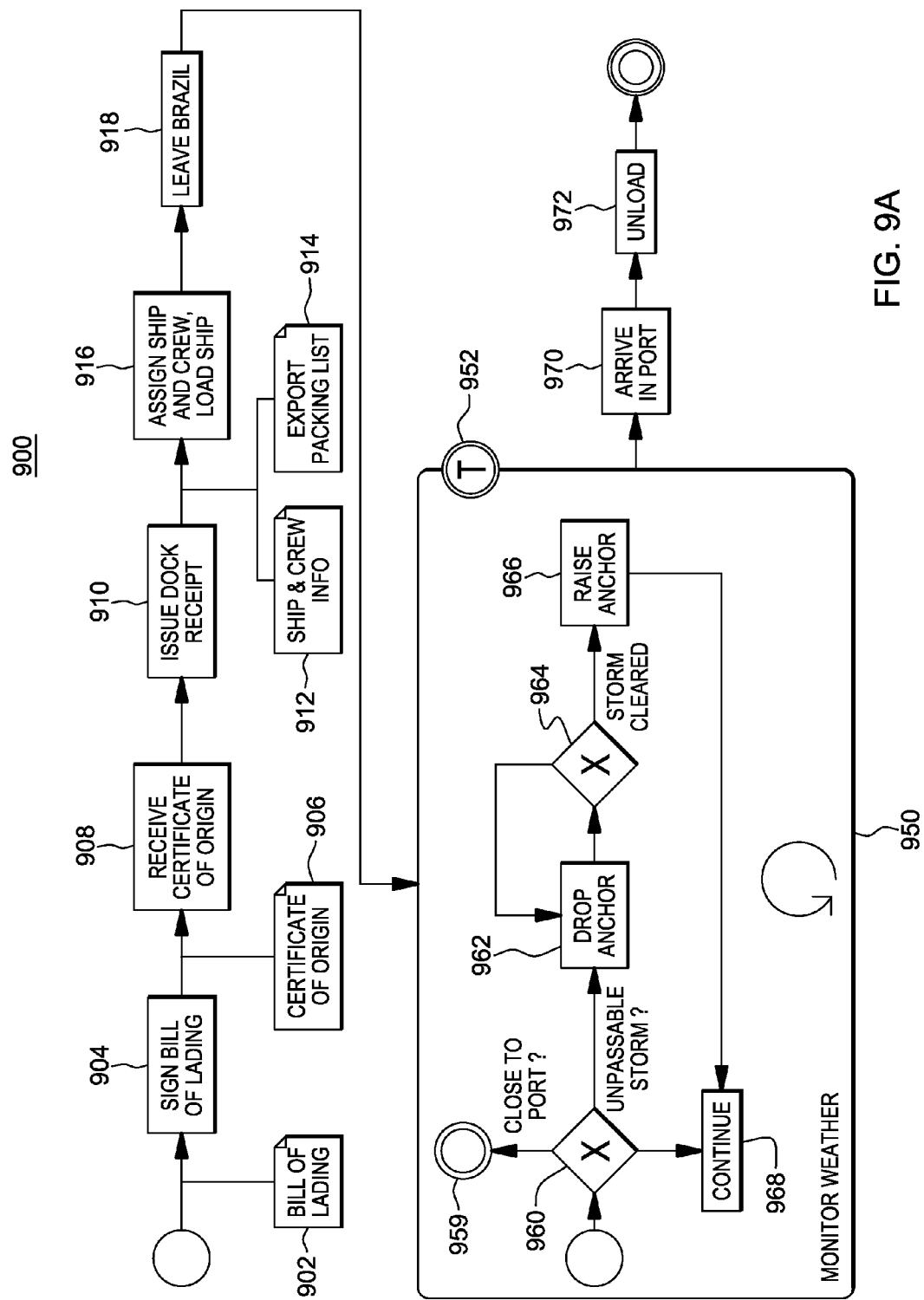
FIG. 9A depicts one example of a process flow from Brazil to Liberia, in accordance with an aspect of the present invention.
Figure 9B:
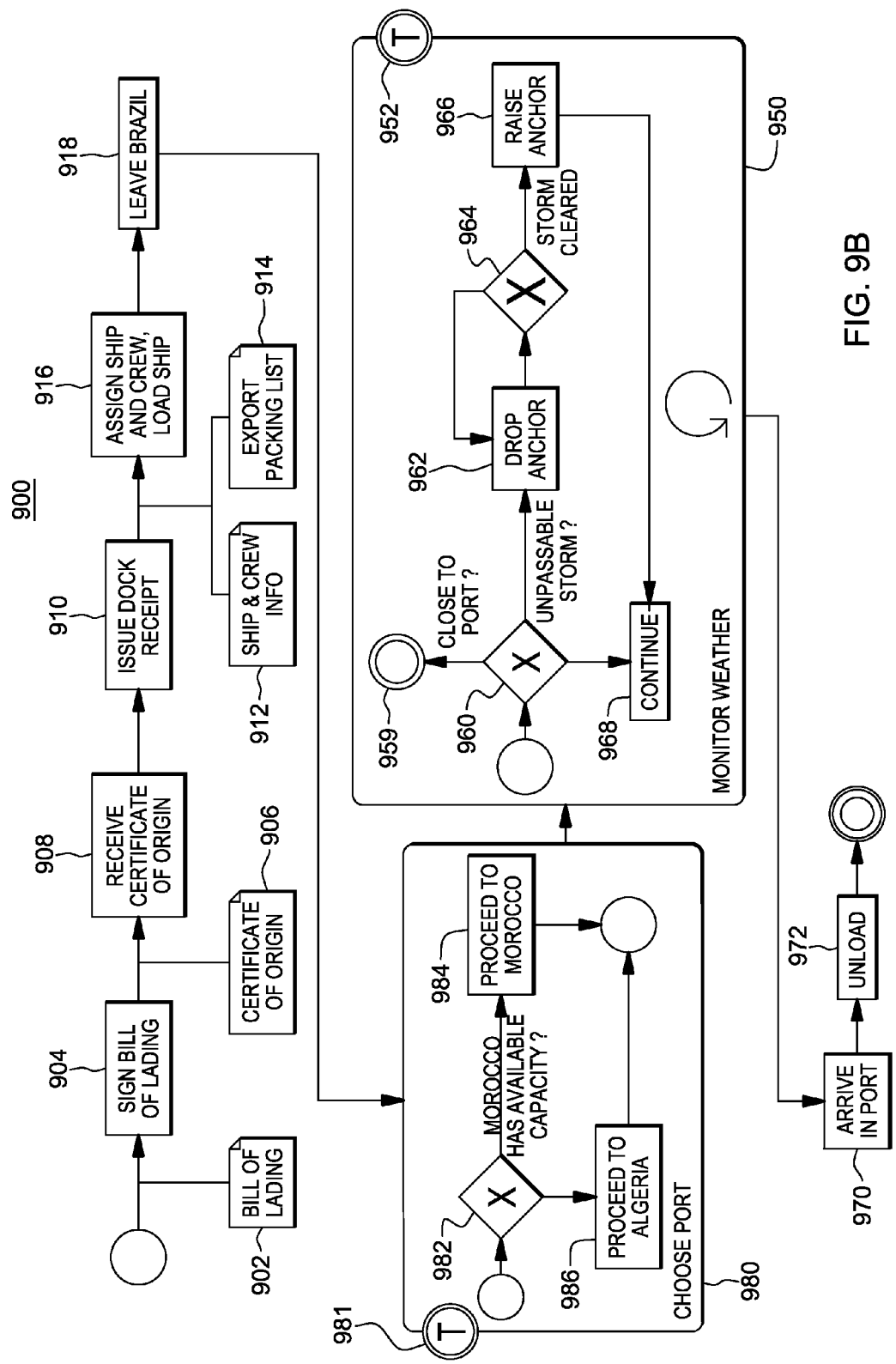
FIG. 9B depicts one example of a process flow from Brazil to Morocco/Algeria resulting from a transfer from the flow of FIG. 9A, in accordance with an aspect of the present invention.

As described above, in accordance with one or more aspects of the present invention, one or more transfer events are added to a process model to accommodate unforeseen events. Examples of using such transfer events are described with reference to FIGS. 9A and 9B. FIG. 9A depicts one example of a shipping flow from Brazil to Liberia; and FIG. 9B depicts one example of a shipping flow from Brazil to Morocco/Algeria. The Brazil to Liberia flow is the preferred flow, but the transfer event provides an opportunity to go to Morocco or Algeria, instead of Liberia, in response to an unforeseen event (e.g., pirates, extreme bad weather, etc.).

Referring to FIG. 9A, a process 900 is depicted, in which a shipping company is sending cargo from Brazil to Liberia. The process starts on a dock in Brazil with signing a bill of lading 902, STEP 904 (the folded corners represent data created and/or used at a particular step); receiving a certificate of origin 906, STEP 908; issuing a dock receipt, STEP 910; assigning ship and crew (using ship and crew information 912) and loading the ship (using export packing list 914), STEP 916; and leaving a port in Brazil, STEP 918. The ship continues to travel at sea.

While at sea, the weather is monitored. In one example, the weather is monitored using a monitor weather sub-process 950. In the monitor weather sub-process, in one example, the weather is monitored as long as the ship is not too close to the port (e.g., within 2 miles). If the ship is close to the port, then the monitoring is stopped, STEP 959. Otherwise, monitoring continues and if an un-passable storm has been encountered, INQUIRY 960, then the anchor is dropped, STEP 962. A determination is made as to whether the storm has cleared, INQUIRY 964. If not, the anchor remains dropped. However, when the storm has cleared, the anchor is raised, STEP 966, and travelling continues, STEP 968. Eventually, the ship arrives in a port in Liberia, STEP 970, and the ship is unloaded, STEP 972.

In accordance with an aspect of the present invention, at the right edge of the monitor weather sub-process, a transfer event 952 is defined that indicates that something could happen while at sea (whether or not related to weather), so here is an opportunity to transfer, if desired. In this example, the transfer event indicates that if signaled, the activity (e.g., going to Brazil) will be canceled and the process will be transferred.

Then, if an unforeseen event occurs (such as pirates at sea causing dangerous conditions travelling to Liberia), a decision may be made (either by human or automatically by a process executing on a processor) to transfer (i.e., save the appropriate state and terminate this process). Further, the transfer may include starting a target process. In this particular example, the transfer includes transferring to a Brazil-Morocco/Algeria flow, as depicted in FIG. 9B. Many of the steps of FIG. 9A are repeated in FIG. 9B, and therefore, the same reference numbers are used in FIG. 9B for clarity.

Referring to FIG. 9B, in this example, the transfer event of FIG. 9A (952) brings the process to a choose port sub-process 980. As shown, this sub-process also includes a transfer event

981, which is on the left border of an activity indicating the transfer is performed before this activity starts.

In this sub-process, a determination is made as to whether the ship should proceed to Morocco or Algeria, instead of Liberia. Thus, in one example, a determination is made as to whether Morocco has available capacity to dock and unload the ship, INQUIRY 982. If so, then the ship proceeds to Morocco, STEP 984. Otherwise, the ship proceeds to Algeria, STEP 986. Processing then continues in sub-process 950, as described above.

Described in detail above is a capability for adding transfer events to a process model to accommodate unforeseen events. During process execution, responsive to a transfer indication being received for a transfer event, a transfer is performed. This includes storing selected state; not storing unselected state; and terminating the process. The stored state may then be forwarded to another process (i.e., a target process) for execution. The another process may be a different process of a completely different process model, as long as both processes (i.e., process instances) have transfer events with the same schema; the same process; or a different version of the same process. If the transfer is to a new version of the process or the same process, execution may start from an earlier stage of the process. For example, assume there is a process instance—i1—of version n of process model pm1, which is up to node 8 in its flow. In the current state of the art, if version n+1 of pm1 is deployed, there is no way to move from node 8 of i1 to, for example, node 5 of an instance of version n+1, or even of version n for that matter, of pm1, without performing complicated compensation and rollback activities. However, since in accordance with an aspect of the present invention, a transfer event with a matching schema is what is used to transfer to another process, it is easy to move to an earlier point in another instance of the same exact process or a new version of the process.

In one example, the capability of one or more aspects of the present invention is independent of the graph structure of the model and can occur irrespective of changes, groups, group boundaries, combination generation, etc. of the model. Selected state is transferred between processes without an examination of, or transformations/mappings between, the process graphs of the processes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 10:
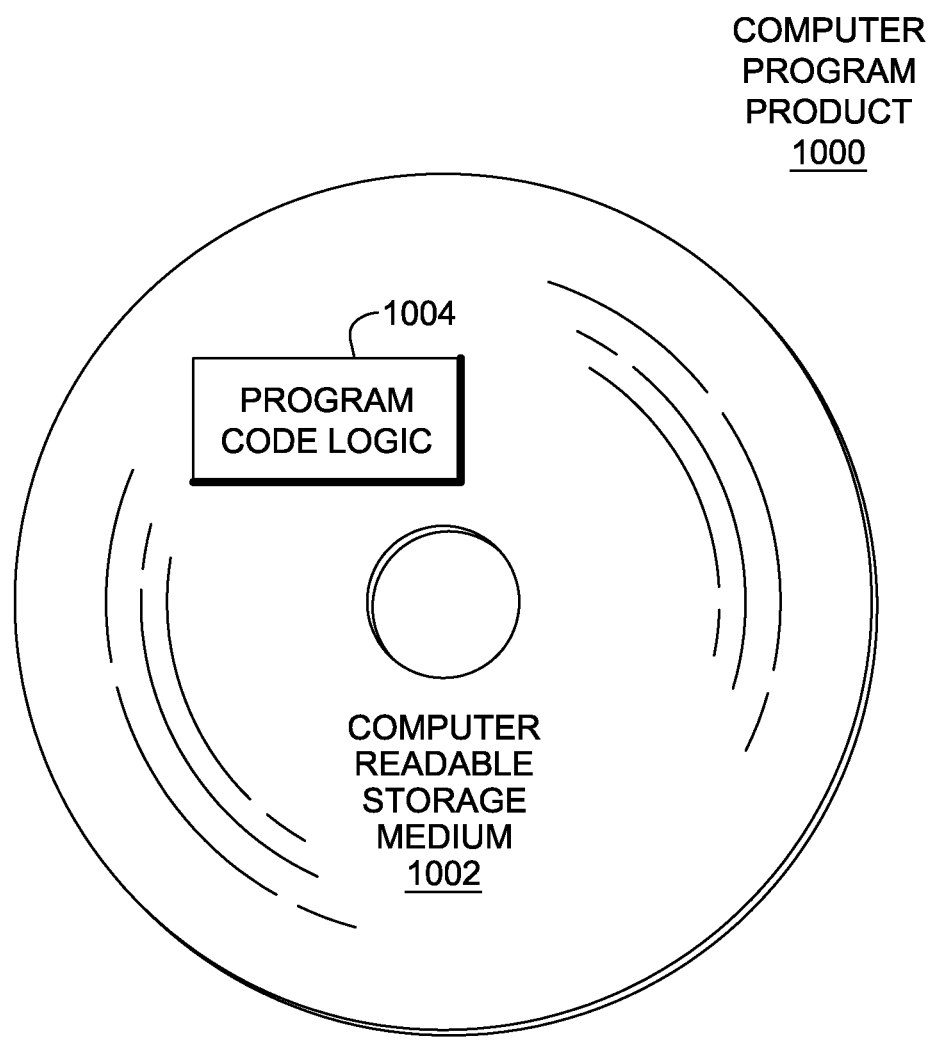
FIG. 10 depicts one embodiment of a computer program product incorporating one or more aspects of the present invention.

Referring now to FIG. 10, in one example, a computer program product 1000 includes, for instance, one or more non-transitory computer readable storage media 1002 to store computer readable program code means or logic 1004 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, other types of sequencing diagrams, modeling languages and/or modeling tools may be used without departing from a spirit of the present invention. Further, in other embodiments, data other than the business state and/or technical state may be the selected data; and similarly, data other than execution state may be unselected data. Yet further, in another embodiment, a transfer event is dynamically added, during runtime, to a process already executing. For instance, it is added to an activity of the process that has not yet executed. Moreover, in other embodiments, an exceptional or alternate path may be defined for a transfer event. Many variations exist without departing from a spirit of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of managing processes of a processing environment, said method comprising:
    obtaining, by a processor of the processing environment, an indication that a transfer event defined for a process executing within the processing environment is to be performed, the indication based on an occurrence of a particular event, and wherein the transfer event is explicitly included in the process at a point in the process at which selected data is to be stored and the process is to be terminated based on performing the transfer event, the transfer event being explicitly included in the process by including a transfer event indicator in a process model used to instantiate the process, the transfer event indicator being one indicator, of a plurality of indicators, selected for inclusion depending on when the process is to transfer relative to performance of a particular activity defined within the process model; and
    performing, by the processor based on the obtaining, the transfer event to transfer out of the process, the transfer including storing selected data of the process and terminating the process, the selected data including a portion of the data of the process that is relevant for the transfer, wherein another portion of the data of the process is unselected, wherein the selected data comprises at least one of at least a portion of business state and at least a portion of technical state of the process, and wherein the unselected data comprises execution state of the process, the at least a portion of business state comprising a collection of elements within the process model used to instantiate the process that represent data whose content and value are defined at a level of a business need that the process model addresses, the at least a portion of technical state comprising a collection of one or more elements within the process that do not exist at the business level but are used to execute the process model, and the execution state comprising a collection of runtime artifacts specific to a runtime used to execute the process model.

2. The method of claim 1, wherein the particular event is an unforeseen event.

3. The method of claim 1, further comprising defining the transfer event for the process, the defining comprising:
    selecting one or more states of a plurality of states of the process that are relevant for the transfer from the process, wherein the selected data comprises at least a portion of the one or more selected states;
    providing one or more schemas for the one or more selected states; and
    mapping one or more elements of the one or more schemas to one or more data elements of the process model.

4. The method of claim 3, further comprising defining a plurality of transfer events for a plurality of defined points within the process, wherein each transfer event provides an opportunity to transfer from the process at its defined point.

5. The method of claim 3, wherein the storing the selected data comprises storing the at least a portion of the one or more selected states according to the one or more schemas provided for the one or more selected states.

6. The method of claim 5, further comprising:
    selecting a target process to accommodate the particular event;
    determining whether the one or more schemas provided for the one or more selected states are valid for the target process; and
    providing the selected data to the target process, based on the determining indicating the one or more schemas are valid.

7. The method of claim 6, further comprising defining a transfer event for the target process, the transfer event for the target process to enable transfer to the target process.

8. The method of claim 1, further comprising:
    initiating a target process to accommodate the particular event; and
    providing the selected data to the target process.

9. The method of claim 8, wherein the target process comprises a new version of the process, the same process or a different process.

10. The method of claim 8, wherein the target process comprises a new version of the process or the same process, and the providing comprises transferring the selected data to a processing stage in the target process that is earlier than a processing stage in the process from which the selected data was transferred.

11. A computer system for managing processes of a processing environment, said computer system comprising:
    a memory; and
    a processor in communications with the memory, wherein the computer system is configured to perform a method, said method comprising:
        obtaining an indication that a transfer event defined for a process executing within the processing environment is to be performed, the indication based on an occurrence of a particular event, and wherein the transfer event is explicitly included in the process at a point in the process at which selected data is to be stored and the process is to be terminated based on performing the transfer event, the transfer event being explicitly included in the process by including a transfer event indicator in a process model used to instantiate the process, the transfer event indicator being one indicator, of a plurality of indicators, selected for inclusion depending on when the process is to transfer relative to performance of a particular activity defined within the process model; and
        performing, based on the obtaining, the transfer event to transfer out of the process, the transfer including storing selected data of the process and terminating the process, the selected data including a portion of the data of the process that is relevant for the transfer, wherein another portion of the data of the process is unselected, wherein the selected data comprises at least one of at least a portion of business state and at least a portion of technical state of the process, and wherein the unselected data comprises execution state of the process, the at least a portion of business state comprising a collection of elements within the process model used to instantiate the process that represent data whose content and value are defined at a level of a business need that the process model addresses, the at least a portion of technical state comprising a collection of one or more elements within the process that do not exist at the business level but are used to execute the process model, and the execution state comprising a collection of runtime artifacts specific to a runtime used to execute the process model.

12. The computer system of claim 11, wherein the method further comprises defining the transfer event for the process, the defining comprising:

selecting one or more states of a plurality of states of the process that are relevant for the transfer from the process, wherein the selected data comprises at least a portion of the one or more selected states;

providing one or more schemas for the one or more selected states; and mapping one or more elements of the one or more schemas to one or more data elements of the process model.

13. The computer system of claim 12, wherein the storing the selected data comprises storing the at least a portion of the one or more selected states according to the one or more schemas provided for the one or more selected states, and wherein the method further comprises:

selecting a target process to accommodate the particular event;

determining whether the one or more schemas provided for the one or more selected states are valid for the target process; and providing the selected data to the target process, based on the determining indicating the one or more schemas are valid.

14. The computer system of claim 13, wherein the method further comprises defining a transfer event for the target process, the transfer event for the target process to enable transfer to the target process.

15. A computer program product for managing processes of a processing environment, said computer program product comprising:

a non-transitory computer readable storage medium readable by a processing circuit and storing instructions for execution by the processing circuit for performing a method comprising:

obtaining an indication that a transfer event defined for a process executing within the processing environment is to be performed, the indication based on an occurrence of a particular event, and wherein the transfer event is explicitly included in the process at a point in the process at which selected data is to be stored and the process is to be terminated based on performing the transfer event, the transfer event being explicitly included in the process by including a transfer event indicator in a process model used to instantiate the process, the transfer event indicator being one indicator, of a plurality of indicators, selected for inclusion depending on when the process is to transfer relative to performance of a particular activity defined within the process model; and performing, based on the obtaining, the transfer event to transfer out of the process, the transfer including storing selected data of the process and terminating the process, the selected data including a portion of the data of the process that is relevant for the transfer, wherein another portion of the data of the process is unselected, wherein the selected data comprises at least one of at least a portion of business state and at least a portion of technical state of the process, and wherein the unselected data comprises execution state of the process, the at least a portion of business state comprising a collection of elements within the process model used to instantiate the process that represent data whose content and value are defined at a level of a business need that the process model addresses, the at least a portion of technical state comprising a collection of one or more elements within the process that do not exist at the business level but are used to execute the process model, and the execution state comprising a collection of runtime artifacts specific to a runtime used to execute the process model.

16. The computer program product of claim 15, wherein the method further comprises defining the transfer event for the process, the defining comprising:

selecting one or more states of a plurality of states of the process that are relevant for the transfer from the process, wherein the selected data comprises at least a portion of the one or more selected states;

providing one or more schemas for the one or more selected states; and mapping one or more elements of the one or more schemas to one or more data elements of the process model.

17. The computer program product of claim 16, wherein the storing the selected data comprises storing the at least a portion of the one or more selected states according to the one or more schemas provided for the one or more selected states, and wherein the method further comprises:

selecting a target process to accommodate the particular event;

determining whether the one or more schemas provided for the one or more selected states are valid for the target process; and providing the selected data to the target process, based on the determining indicating the one or more schemas are valid.

18. The computer program product of claim 15, wherein the method further comprises:

initiating a target process to accommodate the particular event; and providing the selected data to the target process.

* * * * *